Patented Jan. 26, 1937

2,068,793

UNITED STATES PATENT OFFICE 2,068,793

PROCESS FOR THE RAPID RECARBURIZATION OF PIG IRON MELTED IN A CUPOLA FURNACE

Hans Frauenknecht, Genoa, Italy

No Drawing. Application October 17, 1934, Serial No. 748,763. In Italy October 23, 1933

3 Claims. (Cl. 75—44)

This invention relates to a process for the rapid recarburization of iron melted in cupola furnaces which therefore had its carbon contents seriously reduced due to the melting operation in an air blast.

An object of the invention is to render possible the utilization, in the smelting operation, of a still higher percentage of scraps of pig-iron, even of the lowest quality, as white pig-iron, burnt pig-iron, etc.

Previous attempts to use such residues by the addition of fresh quantities of raw pig iron have not proved satisfactory because this results in a pig iron still containing insufficient carbon.

This invention aims to eliminate the said drawbacks and to provide for a means by which the required carbon for the carburization can be added in a practically incombustible form although it may be easily absorbed by the melted metal.

This aim is attained by employing as recarburizing agent for the pig iron melted in the cupola furnace rather finely powdered and incombustible carbonaceous material or carbonaceous material which has been rendered incombustible, whereby when such carbonaceous material is directly fed into the cupola furnace it is employed in form of small blocks obtained by agglomerating the finely powdered relatively incombustible carbonaceous material by means of a suitable agglomerating agent, while when the recarburization is effected on the molten pig iron poured into the ladles, such recarburizing agent is employed in a finely powdered condition.

The invention will be better understood by the following example: For recarburization in a cupola small blocks are employed made of carbonaceous matter and which will crumble at a temperature of about 1450° C. that corresponds to the lower point of the zone of fusion, so to be as much as possible sheltered from the influence of the air blast and to come in contact with the metal when this has absorbed the maximum of calories, this being then the most favorable moment for the absorption of the carbon.

It has been found that the carburization of the pig-iron is rapidly and perfectly obtained using as carburizer pulverized graphite made up in the shape of small bricks, about one cubic decimeter in size, using a viscous organic adhesive, as molasses. In this way a refractory carburizing product is obtained, and such as it will not crumble to pieces by the heat and which will be easily absorbed by the iron or by the pig-iron at the temperature of the cupola.

The invention may be embodied also in different ways without departing from the above basic principle.

Thus other kinds of incombustible carburizers can be employed instead of graphite as for instance wood dust or other carbonaceous matters previously rendered incombustible with soda, sodium silicate or the like, also other elements, as Mn and Si, could be mixed with the carburizing agent; molasses can be replaced by other organic and inorganic adhesives, provided they can be easily burnt out or otherwise eliminated in the form of slag. In some cases the double aim of rendering the carbonaceous matter incombustible and of conglomerating same to bricks or small blocks can be attained by mixing, for instance, the powdered carbonaceous matter with silicate of soda or the like.

I claim:

1. A process for the rapid recarburization of pig iron melted in a cupola furnace, consisting in introducing with the charge a carburizing agent constituted of a substantially incombustible carbonaceous material in the form of small blocks of about one cubic decimeter in size, obtained by finely pulverizing said incombustible carbonaceous material, soaking the same with an organic adhesive and forming the soaked material into blocks.

2. A process for the rapid recarburization of pig-iron in a cupola furnace, characterized in that the carbon is supplied into the furnace in the form of blocks of powdered graphite previously agglomerated with an organic agglomerating agent of the molasses type, whereby the blocks do not crumble to pieces except below the level of the blast, where the graphite returns to a powdered condition and extends over the whole section of the furnace.

3. A process according to claim 1, characterized by the feature that as carburizing agent powdered carbonaceous matter is employed which is previously rendered incombustible by soaking same with a solution of soda.

HANS FRAUENKNECHT